Patented Oct. 29, 1940

2,219,927

UNITED STATES PATENT OFFICE 2,219,927

EMBALMING FLUID

Hilton Ira Jones, Wilmette, Ill., assignor to National Selected Morticians, Chicago, Ill., a corporation of District of Columbia No Drawing. Application September 25, 1939, Serial No. 296,398

3 Claims. (Cl. 27—21)

The present invention is directed to the embalming art and more particularly to improved compositions for use in preserving dead bodies. The subject matter of the present application is disclosed in my prior application now Patent No. 2,113,842, dated April 12, 1938.

In the use of embalming fluids I have found it highly desirable that in certain cases the surface tension thereof be either raised or lowered beyond the normal value of the embalming material. Thus, in general, it is a great advantage if the surface tension of the embalming fluid is lowered for the reason that such lowering of surface tension facilitates the passage of the embalming material through the tissues and capillaries of the body. This is highly desirable where a body has emaciated and shrunken areas wherein the capillaries are of small diameter and also in cases which have been affected by arteriosclerosis and where there has been thrombosis or other obstructions tending to cut down the size of capillaries or arteries through which the fluid must pass.

Such lowering of surface tension to facilitate passage of fluids through the body may be utilized in several ways in the embalming art. Thus, for example, the embalmer may utilize my invention in order to convey coloring matter through the body in order to impart a natural color thereto, and it may also be employed to facilitate the passage of bactericidal agents as well as hardening or tanning fluids such as are generally used in embalming.

Various other applications of my invention will no doubt suggest themselves to those skilled in the art.

Of the substances tested I have found bile salts to be highly efficacious for lowering the surface tension of embalming fluids. These salts comprise essentially the sodium salts of taurocholic and glycocholic acids. I may utilize these salts, individually or together, in relatively pure condition, but find that satisfactory results may be obtained by taking commercial "inspissated ox-gall" having about 70 per cent dry content, dissolving said material in water to a concentration of about 15 per cent solids, heating the same to boiling with a small quantity, say, of about 5 per cent of activated carbon, and then filtering. This treatment removes most of the odor and color and provides a solution which may be used satisfactorily in connection with my invention and at a very low cost. This is diluted to a strength of about 0.1 to 0.2 per cent solids for convenient storage or shipment, but is used in much lower concentrations.

I have found that the effect of such salts on the surface tension of water varies considerably with the concentration, reaching a maximum of efficiency with this dilution of 0.1 to 0.2 per cent solids. This may be further diluted for use by combining one part of said solution with about 64 parts of water.

In general, a highly effective working solution may be of any concentration of solids of about 0.2 per cent or below, although I do not consider my invention as limited to such a figure.

The following formula represents an example of an embalming fluid embodying my invention:

Example I

| | Parts by weight |
|---|---|
| Water | 48 |
| Glycerine | 8 |
| Methanol | 16 |
| Borax | 5 |
| Sodium nitrate | 7 |
| Phenol | 3 |
| Clarified solution (0.2 per cent solids) of inspissated ox-gall | 2 |
| Formaldehyde (40 per cent) | 210 |

I am aware that soaps in general are known to reduce surface tension, but such materials as a class are unsuitable for embalming purposes, inasmuch as they form precipitates with hard water and especially in the presence of calcareous matter in the circulatory system of a body.

I am also aware that certain alcoholic embalming fluids show a relatively low surface tension, but this value is considerably raised after such fluids enter the body and are diluted with the aqueous body fluids, and becomes practically equal to that of water.

I have found that the bile salts maintain their function of reducing surface tension even when used in extremely low concentration. Thus, I have found that this material maintains its capacity to reduce surface tension at dilutions well below 1 per cent.

It will be apparent to those skilled in the art that compositions to be suitable for use in embalming fluids must retain their desirable characteristics in the presence of both the embalming ingredients and the body fluids. It will also be apparent to those skilled in the art that compositions to be suitable for use in embalming fluids must not deleteriously affect the preserving potency of the embalming fluids. Bile salts, as indicated above, have been found adaptable for use in the embalming art and to meet the specified requirements of compositions for use in embalming fluids.

I claim:

1. An embalming fluid containing an agent for lowering the surface tension of said fluid comprising bile salts, said agent facilitating the passage of said fluid through the capillaries whereby coloring matter may be conveyed through the body imparting a color thereto.

2. An embalming fluid containing an agent for lowering the surface tension of said fluid consisting essentially of sodium salts of taurocholic and glycocholic acids, said agent being stable in the presence of embalming and body fluids and facilitating the passage of said fluid through the capillaries and tissues of the body.

3. In the embalming art, an agent facilitating the passage of embalming fluid through the capillaries and tissues of the body consisting of an aqueous solution of ox-gall.

HILTON IRA JONES.